United States Patent [19]

Yamamoto et al.

[11] Patent Number: 4,549,105
[45] Date of Patent: Oct. 22, 1985

[54] SUBMERGIBLE MOTOR INCLUDING CIRCUIT ELEMENT ENCASED IN MOLDED PLUG

[75] Inventors: Sakuei Yamamoto; Mitsuhiro Nishida; Hiroshi Inao; Noboru Tashiro, all of Fukuoka; Kiyoshi Hani, Hyogo, all of Japan

[73] Assignee: Mitsubishi Denki Kabushiki Kaisha, Japan

[21] Appl. No.: 569,140

[22] Filed: Jan. 9, 1984

[30] Foreign Application Priority Data

| Jan. 7, 1983 | [JP] | Japan | 58-1366 |
| Jan. 7, 1983 | [JP] | Japan | 58-1367 |
| Jan. 7, 1983 | [JP] | Japan | 58-1368 |
| Aug. 25, 1983 | [JP] | Japan | 58-156661 |
| Aug. 25, 1983 | [JP] | Japan | 58-156662 |

[51] Int. Cl.$^4$ .............. H01R 13/52; H01R 13/68; H02K 11/00
[52] U.S. Cl. ........................ 310/87; 310/43; 310/71
[58] Field of Search ............ 310/71, 68 C, 72, 87, 310/43, 45; 339/147 R, 147 D; 361/117; 264/272.11, 272.17, 272.19

[56] References Cited

U.S. PATENT DOCUMENTS

| 4,053,196 | 10/1977 | Dunaway | 310/87 |
| 4,113,341 | 9/1978 | Hughes | 339/147 R |
| 4,307,925 | 12/1981 | Drew | 339/147 R |
| 4,437,027 | 3/1984 | Yamamoto et al. | 310/43 |
| 4,442,366 | 4/1984 | Cuneo | 310/50 |

FOREIGN PATENT DOCUMENTS

| 24585 | 3/1981 | European Pat. Off. | 361/117 |
| 2309055 | 12/1976 | France | 339/147 P |
| 2384367 | 11/1978 | France | 339/147 R |

Primary Examiner—Peter S. Wong
Assistant Examiner—D. L. Rebsch
Attorney, Agent, or Firm—Sughrue, Mion, Zinn, Macpeak, and Seas

[57] ABSTRACT

A submergible motor for use in a well of water, for example, comprises a motor winding, an insulated power supply conductor for connection to a power supply, an insulated motor conductor connected to the motor winding, and a circuit element electrically connected between the power supply and motor conductors, the circuit element being encased in a molded material in a water-resistant manner and connected to the power supply and/or motor conductors.

6 Claims, 13 Drawing Figures

FIG. 7
FIG. 9
FIG. 10
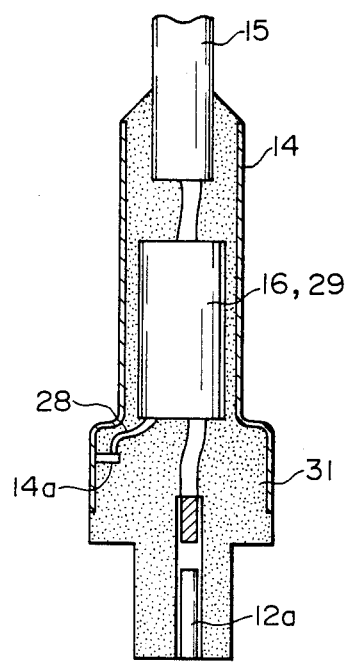
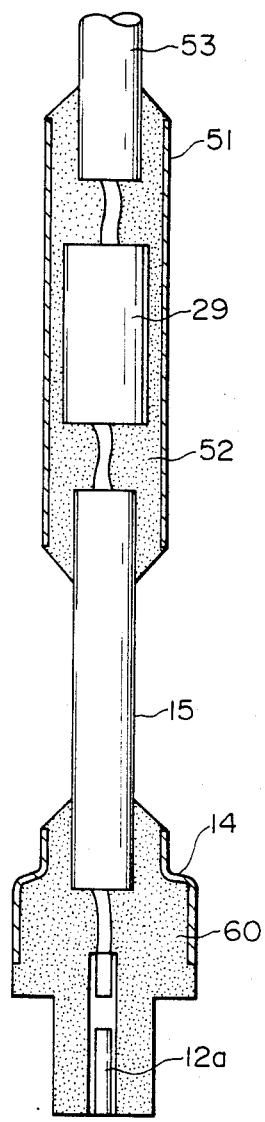
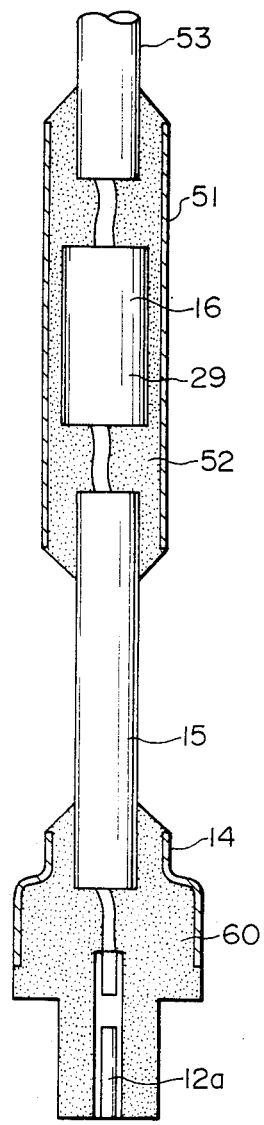

FIG. 11A
FIG. 11B
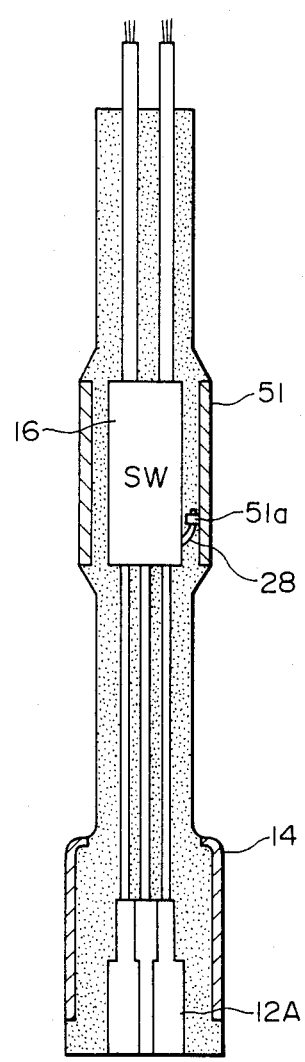
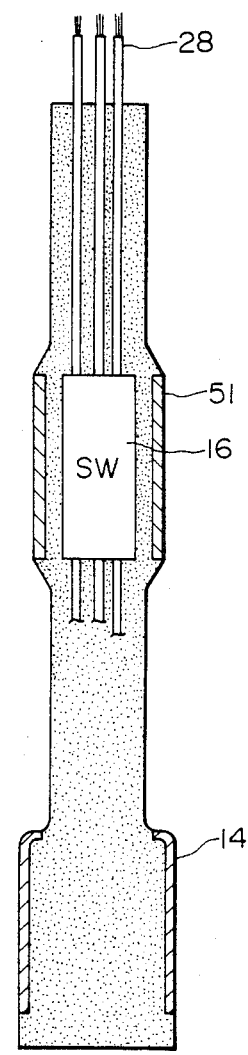

SUBMERGIBLE MOTOR INCLUDING CIRCUIT ELEMENT ENCASED IN MOLDED PLUG

BACKGROUND OF THE INVENTION

The present invention relates to a single-phase submergible motor for use in a well of water under submerged condition.

FIGS. 1 and 2 of the accompanying drawings illustrate a conventional single-phase submergible motor. The submergible motor comprises a stator 1 composed of a stator core 2 and a stator winding 3 wound around the stator core 2, and a frame 4 molded of a resin material such as polyester or vinyl ester and encasing the stator 1. The frame 4 has a bottomed hole 4a defined in one side thereof, and another bottomed hole 4b defined in an opposite side thereof in diametrically opposite relation to the recess or bottomed hole 4a. A thin cylindrical sleeve 5 of stainless steel is placed in and held against the inner peripheral surfaces of the stator core 2 and the frame 4. A bracket 6 of molded resin is fastened to one end of the frame 4 and has a bottomed hole 6a opening toward frame 4 in coaxial relation to the hole 4a and another hole 6b opening toward the frame 4 in coaxial relation to the hole 4b. The bracket 6 also has a through hole 6c communicating between the hole 6a and an outer end surface thereof.

The submergible motor also includes a rotor core 7 coacting with the stator motor 2. A rotor shaft 8 is fitted in an inner peripheral surface of the rotor core 7 and has one end portion rotatably supported by a sleeve bearing 9 in the bracket 6, the rotor shaft 8 having an end projecting from the outer end surface of the bracket 6. A water deflector 10 is fitted over the end of the rotor shaft 8 projecting from the bracket 6 and has one end surface held in slidable contact with an outer end surface of the bracket 6. A water seal 11 composed of an oil seal is fitted in an inner peripheral surface of the bracket 6. A male connector 12 for connection to the stator is encased in the bottomed hole 4a. Lead wires 13 have opposite ends connected respectively to the male connector 12 and the stator winding 3. A female connector 14 for connection to a power supply is fitted in the bottomed holes 4a, 6a and connected to contact pins 12a of the male connector 12. A power cable 15 has one end connected to the female connector 14 and extends through the hole 6c, the power cable 15 having an opposite end coupled to a power supply (not shown). A starter switch unit 16 is disposed resiliently in a recess 6d defined in the bracket 6. A male connector 17 for connection to the starter switch unit 16 is encased in the bottomed hole 4b, and a female connector 18 for the starter switch unit 16 is fitted in the bottomed holes 4b, 6b. A male connector 19 for the starter switch unit 16 is encased in the bottomed hole 6b. The male connector 18 for the starter switch unit 16 and the male connector 12 for the stator are interconnected by lead wires 20 encased in the frame 4. The starter switch unit 16 and the male connector 19 are connected to each other. The male connectors 17, 19 have contact pins 17a, 19a joined to the female connector 18. Four threaded members 21 (FIG. 2) are embedded in the frame 4 and have openings that open toward the bracket 6. Threaded fasteners (not shown) are threadedly inserted in the threaded members 21 to couple the frame 4 and the bracket 6 together.

When lightning strikes the submergible motor thus constructed, a lightning surge finds its way from the power cable 15 to the power supply connector 14 to the stator connector 12 to the lead wires 13 to the stator winding 3, with the result that the power cable 15 and the motor as a whole are subjected to severe damage.

SUMMARY OF THE INVENTION

It is an object of the present invention to provide a submergible motor which will be protected against damage due to lightning.

Another object of the present invention is to provide an economic submergible motor which is reliable in operation.

According to the present invention, a lightning arrester or guard is accommodated in a water-resistant fashion within a power supply connector or in the vicinity of the power supply connector, and connectd to a power cable and grounded to the power supply connector.

A starter switch unit comprises an integrated circuit of a greatly reduced size and is accommodated in a water-resistant manner in the power supply connector or in the vicinity thereof, the starter switch unit being removable from the motor body.

The lightning guard and the starter switch unit are small in size and thus housed in a water-resistant manner within the power supply connector or in a portion near the power supply connector.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a cross-sectional view of a power supply connector according to a third embodiment of the present invention;

FIG. 9 is a cross-sectional view of the power supply and intermediate connectors in the submergible motor shown in FIG. 8;

FIG. 10 is a cross-sectional view of a power supply connector according to a fifth embodiment of the present invention;

FIGS. 11A and 11B show the manners in which grounding wires are connected; and

DESCRIPTION OF THE PREFERRED EMBODIMENTS

Figure 4:
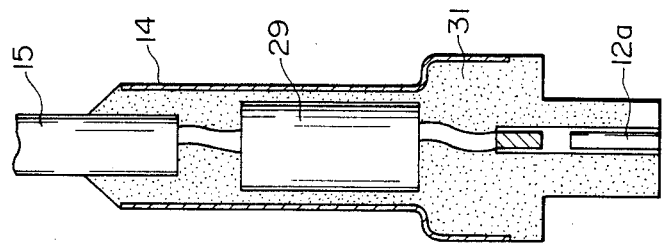
FIG. 4 is a cross-sectional view of a power supply connector in the submergible motor shown in FIG. 3.
Figure 3:
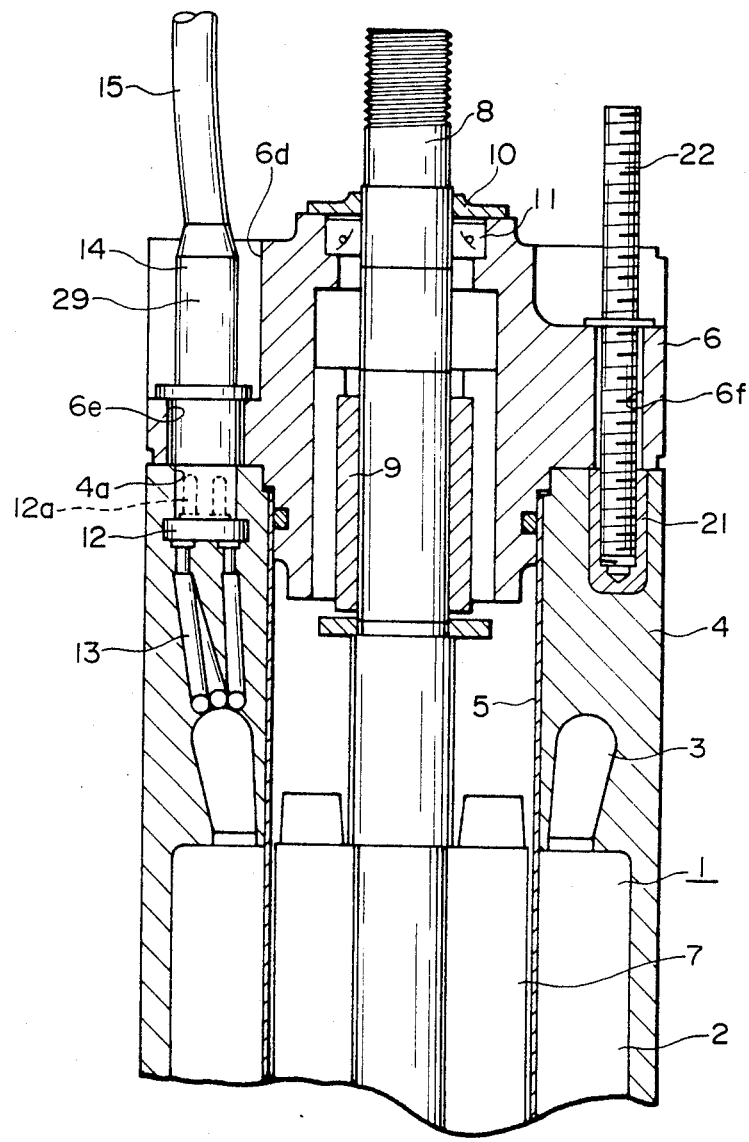
FIG. 3 is a fragmentary cross-sectional view of a submergible motor according to an embodiment of the present invention.
Figure 5:
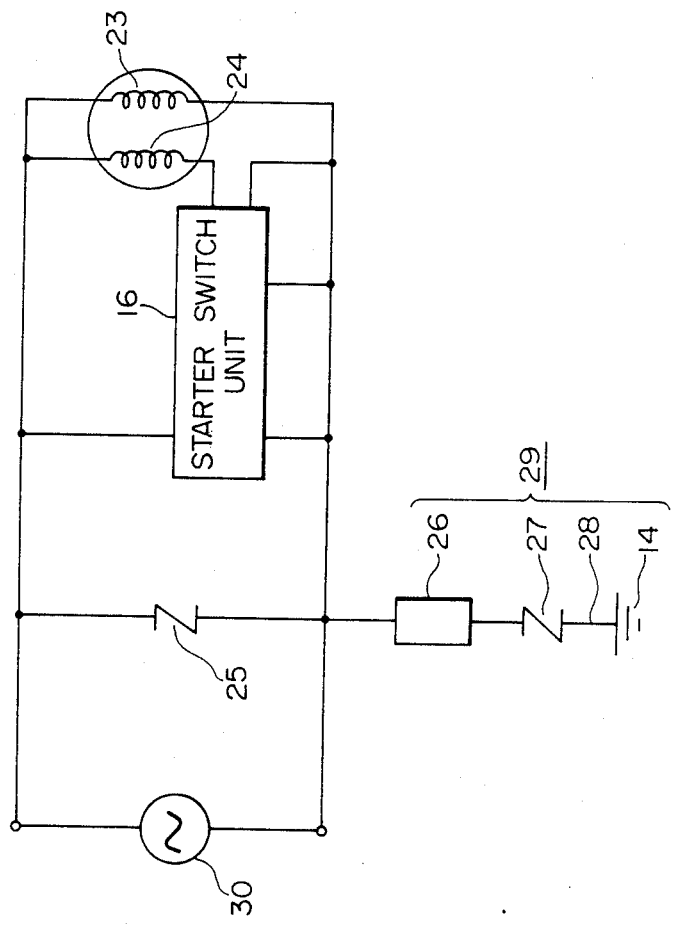
FIG. 5 is a circuit diagram of a wiring arrangement for the submergible motor illustrated in FIG. 3.

FIGS. 3 through 5 show a single-phase submergible motor according to an embodiment of the present invention.

The submergible motor includes a bracket 6 having a recess 6d defined in its outer edge, a through hole 6e communicating with the recess 6d, and four through holes 6f respectively coaxial with four threaded members 21 mounted in a motor frame or casing 4. Fastening bolts 22 extend respectively through the holes 6f and have ends threaded in the threaded members 21, respectively, to fasten the bracket 6 to the frame 4. A power supply connector 14 made of a conductive material is connected to a power cable 15 and has one end fitted in water-resistant manner in a bottomed hole 4a in the frame 4 and detachably connected to a stator male connector 12. The power supply connector 14 has an intermediate portion extending through the hole 6e and an opposite end loosely fitted in the recess 6d.

As shown in FIG. 5, the submergible motor also includes main and auxiliary windings 23, 24, a starter switch unit 16, surge absorber elements 25, 26, 27, and a grounding wire 28 connected to the power supply connector 14. The surge absorber elements 25, 26, 27 and the grounding wire 28 jointly constitute a lightning arrester or guard 29. Designated at 30 is an AC power supply.

Figure 1:
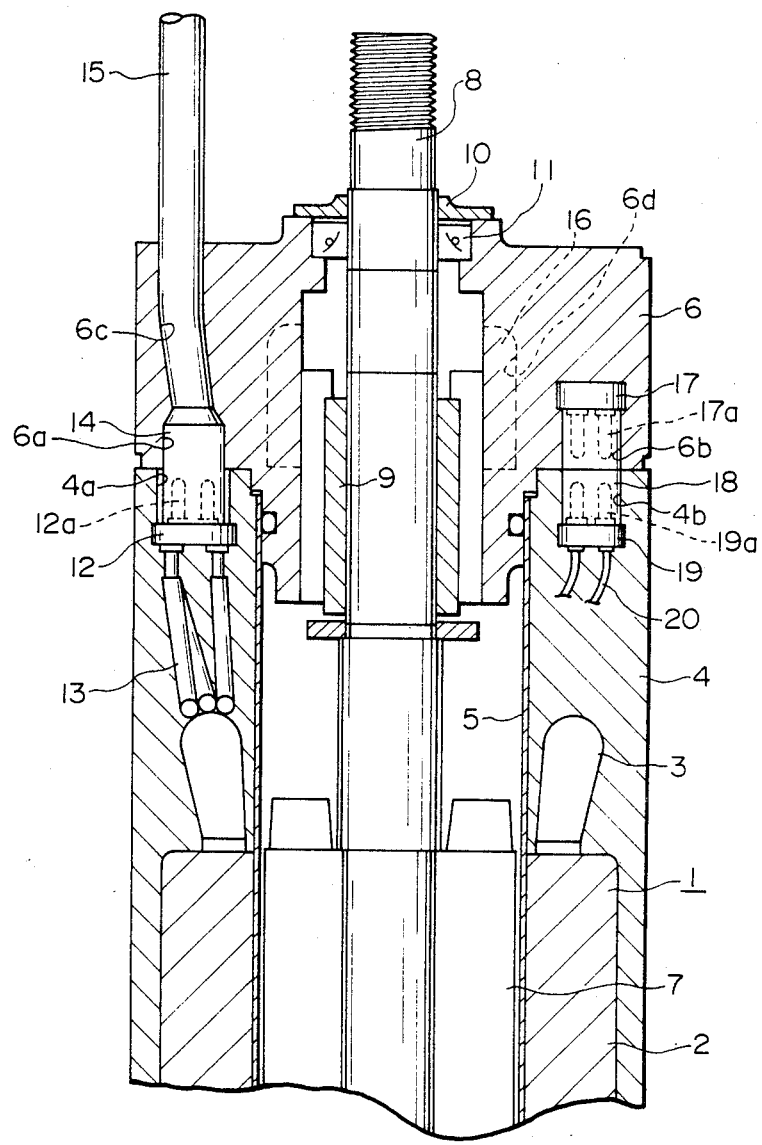
FIG. 1 is a fragmentary cross-sectional view of a conventional single-phase submergible motor.
Figure 2:
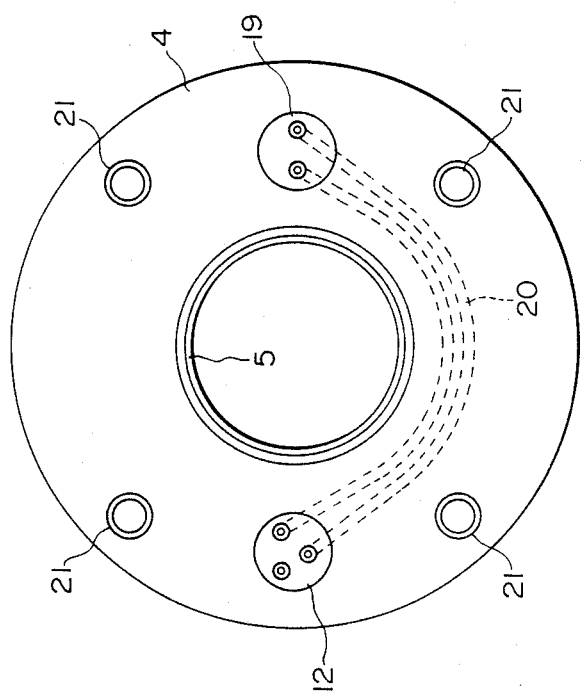
FIG. 2 is a plan view of a frame of the submergible motor shown in FIG. 1.

As shown in FIG. 4, a water seal made of an insulating material is poured and solidified in the power supply connector 14 to accommodate the lightning arrester 29 in water-resistant manner. The starter switch unit 16 is accommodated in water-resistant fashion in a suitable portion of the bracket 6. The remaining construction of the submergible motor of the invention is the same as that of the conventional single-phase submergible motor shown in FIGS. 1 and 2, and will not be described in detail.

When lightning strikes the submergible motor of the foregoing construction, a lightning surge flows from the power cable 15 to the lightning arrester 29 of the power supply connector 14. Since, however, the lightning arrester 29 is disposed more closely to the power cable 15 than the junction between the power supply connector 14 and the stator connector 12, the lightning surge goes to ground through the power supply connector 14 before reaching the starter switch unit 16. Therefore, the starter switch unit 16 and the motor itself are protected from damage due to lightning. The other operations of the submergible motor are well known in the art, and will not be described.

The present invention is not limited to the illustrated embodiment. For example, the surge absorber elements 25, 26, 27 connected to the power cable 15 may be covered with an insulating material in a water-resistant fashion and may be connected to the bracket 6 in the vicinity of the power supply connector 14, with the surge absorber element 27 coupled by the grounding wire 28 to the power supply connector 14.

Figure 6:
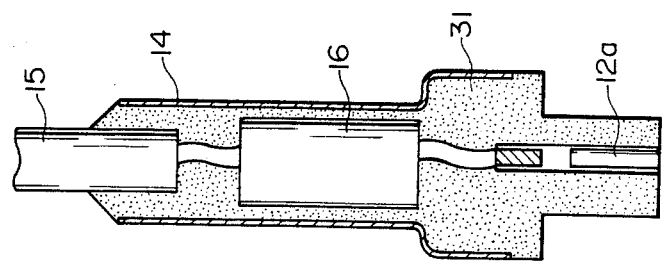
FIG. 6 is a cross-sectional view of a power supply connector according to a second embodiment of the present invention.

FIG. 6 shows another embodiment of the present invention. In FIG. 6, a starter switch unit 16 is disposed within a power supply connector 14 and rendered water-resistant by a water seal 31, such as of resin poured and then solidified in the power supply connector 14. The remaining construction is the same as that shown in FIGS. 3 through 5. The present invention is not limited to the exact embodiment shown in FIG. 6. As an example, the starter switch unit 16 may be covered with resin in a water-resistant manner, and the mass of resin may be connected by a connector to the power supply connector 14.

With the construction of FIG. 6, the stator connector connected to the stator winding is connected to an inner peripheral portion of the frame, and the starter switch unit comprising an integrated circuit is accommodated in a water-resistant manner within the power supply connector removably connected to the stator connector and coupled to the power cable or in the vicinity of the power supply connector. The motor is thus of a simple construction, and can be assembled and disassembled with ease, and hence can be manufactured less costly and handled easily. The starter switch unit is not affected by thermal or magnetic infuences of the motor, and will operate reliably without fail, as it is cooled by an external liquid at all times. The submergible motor is also of practical advantage in that the starter switch unit can conveniently be repaired or replaced.

FIG. 7 illustrates a power supply connector according to still another embodiment of the present invention. As shown in FIG. 7, a lightning arrester 29 and a starter switch unit 16 are accommodated in a water-resistant manner by a water seal 31 poured and then solidified in the power supply connector 14. The lightning arrester 29 is connected to a power cable 15, and the starter switch unit 16 is coupled to the lightning arrester 29. The remaining arrangement remains the same as that of the preceding embodiments.

While in the embodiment of FIG. 7 the starter switch unit 16 and the lightning arrester 29 are accommodated in a water-resistant manner in the power supply connector 14, the lightning arrester 29 and the starter switch unit 16 may bodily be accommodated in an insulating material and connected to a bracket 6 adjacent to the power supply connector 14.

With the embodiment shown in FIG. 7, the stator connector connected to the stator winding is coupled to an inner peripheral portion of the frame, and the lightning arrester is connected to an inner peripheral portion of the power supply connector removably connected to the stator connector and coupled to the power cable or is connected to the power cable in the vicinity of the power supply connector. The lightning arrester and the starter switch unit connected thereto are bodily accommodated in a water-resistant manner. The starter switch unit is of a much simpler construction, can be assembled and disassembled with ease, and hence can be manufactured inexpensively, and handled easily. Since the starter switch unit and the lightning arrester are completely separate from the motor body, the starter switch unit and the lightning arrester can easily and speedily be repaired and replaced. When the submergible motor is hit by lightning, the starter and the motor itself are protected against damage. Therefore, the submergible motor is highly economical in use.

As illustrated in FIG. 7, a grounding wire 28 may be connected to a member 14a cut out of and joined to the connector 14. The grounding wire 28 may be connected in other ways.

Figure 8:
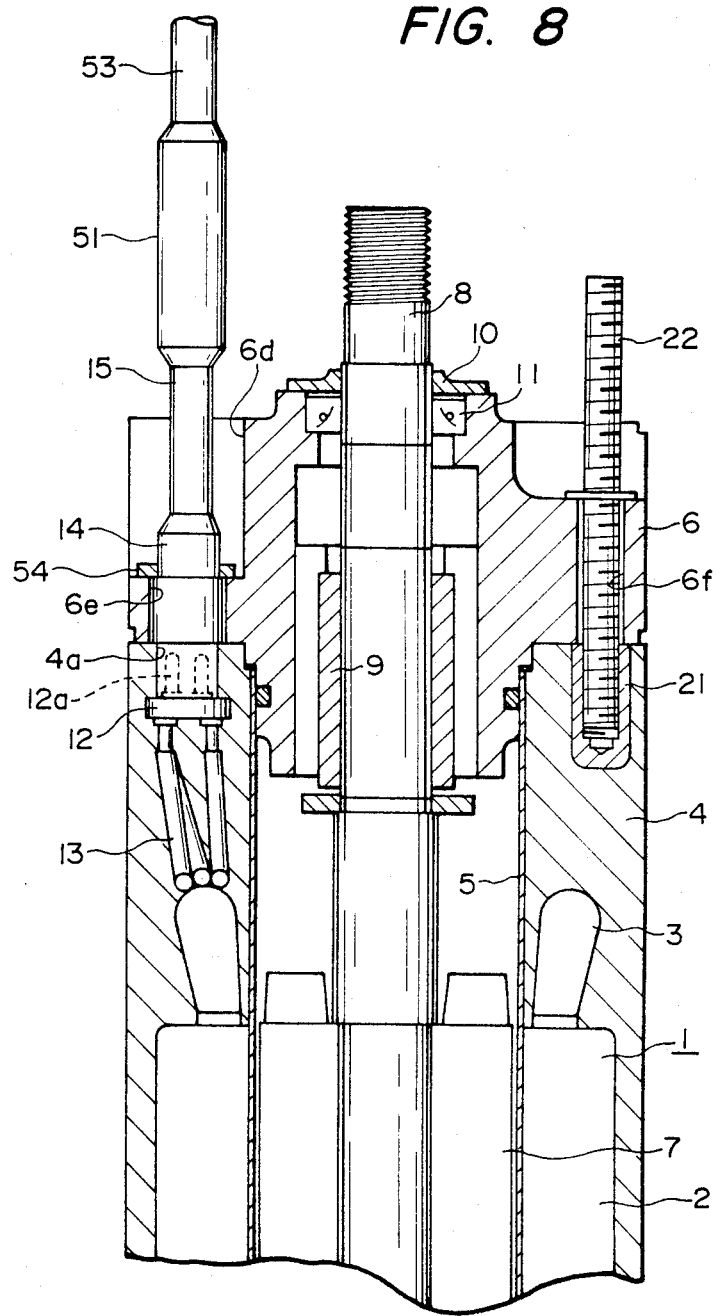
FIG. 8 is a fragmentary cross-sectional view of a submergible motor according to a fourth embodiment of the present invention.

FIGS. 8 and 9 illustrate a submergible motor according to still another embodiment of the present invention.

An intermediate connector 51 houses a lightning arrester 29 sealed in a water-resistant manner in a water seal 52 of resin poured and then solidified in the intermediate connector 51. A power supply connector 14 is joined to a bracket 6 by a mounting plate or flange 54 that is fixed by screws (not shown) to the bracket 6. The lightning arrester 29 is connected to power cables 15, 53. A starter switch unit 16 is accommodated in a suitable portion of the bracket 6 or in the power supply connector 14. The remaining construction is the same as that of the conventional single-phase submergible motor, and its description is omitted.

When lightning strikes the submergible motor of the foregoing construction, a lightning surge goes from the power cable 53 to the lightning arrester 29 to the intermediate connector 51. Since the lightning arrester 29 is disposed more closely to the power cable 53 than the junction between the power supply connector 14 and the stator connector 12, the lightning surge goes to ground through the intermediate connector 51 before it reaches the starter switch unit 16. Therefore, the starter switch unit 16 and the motor itself are protected from damage due to lightning. The operation of the submergible motor is well known in the art, and will not be described.

FIG. 10 illustrates a still further embodiment of the present invention. A lightning arrester or guard 29 is composed of surge absorber elements 25, 26, 27 and a grounding wire 28 and accommodated in a water-resistant fashion in an intermediate connector 51. The lightning arrester 29 is connected to a power cable 15, and a starter switch unit 16 is connected to the lightning arrester 29.

With this arrangement, the starter switch unit and the lightning arrester are completely separate from the motor body, so that the starter switch unit and the lightning arrester can easily and speedily be repaired and replaced. When the submergible motor is hit by lightning, the starter and the motor itself are protected against damage. Therefore, the submergible motor is highly economical in use.

FIGS. 11A and 11B show how to connect a grounding wire 28. As shown in FIG. 11A, the grounding wire 28 is connected to a metal frame 51 by a member 51a cut out of and joined to the metal frame 51. This grounding arrangement increases thermal conductivity. In FIG. 11B, a grounding wire 28 extends upwardly through the power cable.

The single-phase submergible motor thus constructed is protected against any damage when it is struck by lightning, and hence is highly reliable and economical.

In the foregoing embodiments, the frame 4 and the bracket 6 are molded of resin such as polyester or vinyl ester. However, the frame 4 may comprise a steel pipe or be formed from a steel plate, and the bracket 6 may be made of cast iron.

Figure 12:
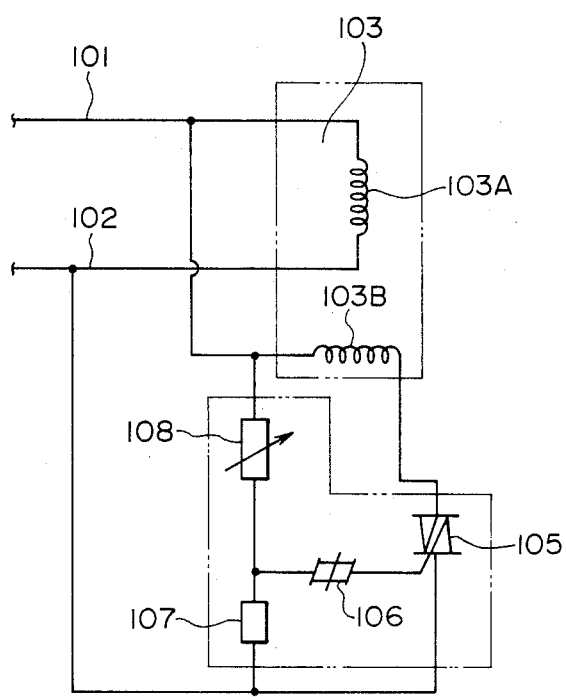
FIG. 12 is a circuit diagram of a circuit arrangement for a submergible motor according to the present invention.

FIG. 12 shows a circuit arrangement according to a still further embodiment for starting a single-phase inductor motor employing a three-pole AC control device. Designated at 101, 102 are power lines connected to a single-phase power supply, 103 a single-phase inductor motor of the split-phase starting type having a main coil 103A and an auxiliary coil 103B. A three-pole AC control device 105 is connected in series with the auxiliary coil 103B of the motor. A trigger element 106 comprising a bidirectional diode 106 is connected to the gate of the three-pole AC control device 105. A resistor 107 serves to determine the trigger voltage of the trigger element 106. A thermistor 108 having a positive temperature coefficient of resistance allows a trigger current to flow through the trigger element 106 immediately after a current has passed through the thermistor 108, but will cut off the trigger current due to an increase in the resistance thereof thereafter (after the single-phase induction motor 103 has completely been started).

At the same time that a single-phase voltage is applied across the power lines 101, 102 a gate current is supplied to the three-pole AC control device 105 to render the latter conductive, whereupon a current flows through the auxiliary coil 103B to get the single-phase induction motor 103 started. After the motor 103 has completely been started, the resistance of the thermistor 108 is increased due to the heating itself to the point where no gate current is fed to the three-pole AC control device 105, which is then rendered nonconductive. The motor 103 continues to rotate efficiently with only the main coil 108A energized.

The present invention is also applicable to other single-phase induction motors than those of the split-phase starting type.

With this arrangement, no motor current flows through the three-pole AC control device, and hence the latter can be smaller in size.

Although certain preferred embodiment have been shown and described, it should be understood that many changes and modifications may be made therein without departing from the scope of the appended claims.

What is claimed is:

1. A submergible motor, comprising;
a motor winding, an insulated power supply conductor for connection to a power supply, an insulated motor conductor connected to said motor winding, and circuit means electrically connected between said power supply and motor conductors, said circuit means comprising a lightning arrester and starter circuit means arranged serially between said power supply and motor conductors, said lightning arrester and starter circuit means being encapsulated in a solidified molded material in a water-resistant manner and being integrally formed with at least one of said power supply and motor conductors, and a tubular metallic sleeve for encasing said circuit means and said encapsulating material, and engaging a bracket portion of said motor.

2. A submergible motor according to claim 1, further comprising means for grounding said lightning arrester to said metallic sleeve.

3. A submergible motor according to claim 1, wherein said insulated power supply conductor comprises a power supply conductor and a grounding conductor.

4. A submergible motor according to claim 1, including a stator, a frame surrounding said stator, a stator connector disposed in said frame, and a power supply connector removably coupled to said stator connector, said circuit element being accommodated in said power supply connector.

5. A submergible motor according to claim 1, wherein said submergible motor comprises a single-phase induction motor of the split-phase starting type having an auxiliary coil, said starter circuit means comprising an integrated circuit composed of a switching device connected in series with said auxiliary coil and having a gate, a trigger element connected to said gate of said switching device, and a control circuit for controlling said trigger element.

6. A submergible motor according to claim 1, wherein said molded material is an insulating material poured and solidified within a power supply connector comprising said metallic sleeve and receiving said power supply conductor.

* * * * *